(12) United States Patent
Srinivasan et al.

(10) Patent No.: US 11,244,464 B2
(45) Date of Patent: Feb. 8, 2022

(54) METHOD AND APPARATUS FOR PERFORMING DEPTH ESTIMATION OF OBJECT

(71) Applicant: Samsung Electronics Co., Ltd., Gyeonggi-do (KR)

(72) Inventors: Karthik Srinivasan, Bangalore (IN); Pradeep Kumar Sindhagatta Krishnappa, Bengaluru (IN); Pranav Prakash Deshpande, Bengaluru (IN); Rituparna Sarkar, West Bengal (IN)

(73) Assignee: Samsung Electronics Co., Ltd

( * ) Notice: Subject to any disclaimer, the term of this patent is extended or adjusted under 35 U.S.C. 154(b) by 27 days.

(21) Appl. No.: 16/296,932

(22) Filed: Mar. 8, 2019

(65) Prior Publication Data

US 2019/0279379 A1  Sep. 12, 2019

(30) Foreign Application Priority Data

Mar. 9, 2018  (IN) .............................. 201841008808
Oct. 23, 2018  (IN) ........................ CS-201841008808

(51) Int. Cl.
*G06T 7/50* (2017.01)
*G06T 7/20* (2017.01)
*G06T 3/40* (2006.01)
*G06T 5/50* (2006.01)

(52) U.S. Cl.
CPC .................. *G06T 7/50* (2017.01); *G06T 3/40* (2013.01); *G06T 5/50* (2013.01); *G06T 7/20* (2013.01); *G06T 2207/10024* (2013.01); *G06T 2207/10028* (2013.01); *G06T 2207/20212* (2013.01)

(58) Field of Classification Search
CPC .... G06T 7/50; G06T 7/20; G06T 3/40; G06T 5/50; G06T 2207/10024; G06T 2207/20212; G06T 2207/10028; G06K 9/00791; G06K 9/00671; G06K 9/6202
See application file for complete search history.

(56) References Cited

U.S. PATENT DOCUMENTS

| 9,910,059 B2 * | 3/2018 | Bae ........................ G01P 13/045 |
| 2012/0206335 A1 | 8/2012 | Osterhout et al. |
| 2014/0125994 A1 | 5/2014 | Kim et al. |

(Continued)

FOREIGN PATENT DOCUMENTS

WO  WO 2013/124312  8/2013

OTHER PUBLICATIONS

International Search Report dated Jun. 5, 2019 issued in counterpart application No. PCT/KR2019/002776, 11 pages.

(Continued)

*Primary Examiner* — Aaron W Carter
(74) *Attorney, Agent, or Firm* — The Farrell Law Firm, P.C.

(57) ABSTRACT

A method and apparatus are provided for performing depth estimation of an object in an image of a scene. The method includes capturing the image of a scene; obtaining, by a sensor, from the image, pixel intensity data and event data; generating an event depth map using the event data, wherein the event data includes event map data of the image and event velocity data of the image; and generating a depth map for the object in the image using the event depth map and the pixel intensity data.

18 Claims, 19 Drawing Sheets

(56) References Cited

U.S. PATENT DOCUMENTS

| | | | |
|---|---|---|---|
| 2015/0192408 A1* | 7/2015 | Bae | G01P 13/045 |
| | | | 702/150 |
| 2016/0119611 A1 | 4/2016 | Hall et al. | |
| 2016/0274643 A1 | 9/2016 | Liu et al. | |
| 2017/0084044 A1 | 3/2017 | Keh et al. | |
| 2017/0178352 A1* | 6/2017 | Harmsen | G06K 9/6215 |
| 2017/0251194 A1 | 8/2017 | Plank et al. | |
| 2017/0272724 A1 | 9/2017 | Lim | |
| 2017/0278221 A1 | 9/2017 | Ji et al. | |
| 2018/0376067 A1* | 12/2018 | Martineau | G06T 7/70 |
| 2019/0058859 A1* | 2/2019 | Price | G06T 7/55 |
| 2019/0154834 A1* | 5/2019 | Heidrich | G01S 17/894 |
| 2019/0197715 A1* | 6/2019 | Rebecq | G06T 15/06 |
| 2019/0279379 A1* | 9/2019 | Srinivasan | G06T 3/40 |
| 2019/0361259 A1* | 11/2019 | Sapienza | G06T 7/50 |
| 2020/0111225 A1* | 4/2020 | Chondro | G06T 7/10 |
| 2020/0134827 A1* | 4/2020 | Saha | G06K 9/00791 |
| 2020/0137287 A1* | 4/2020 | Krishnappa | H04N 5/2351 |
| 2020/0265590 A1* | 8/2020 | Daniilidis | G06N 3/0454 |

OTHER PUBLICATIONS

Moritz B. Milde et al., "Bioinspired Event-driven Collision Avoidance Algorithm based on Optic Flow", XP032795378, Jun. 17, 2015, 7 pages.

Mueggler et al., "Lifetime Estimation of Events from Dynamic Vision Sensors", IEEE Intl. Conference on Robotics and Automation (ICRA), XP033169090, May 26-30, 2015, 8 pages.

European Search Report dated Oct. 29, 2020 issued in counterpart application No. 19763730.9-1210, 12 pages.

* cited by examiner

METHOD AND APPARATUS FOR PERFORMING DEPTH ESTIMATION OF OBJECT

CROSS-REFERENCE TO RELATED APPLICATION(S)

This application is based on and claims priority under 35 U.S.C. § 119 to Indian Provisional Patent Application No. 201841008808 (PS), filed on Mar. 9, 2018, in the Indian Patent Office and to an Indian Patent Application No. 201841008808 (CS), filed on Oct. 23, 2018, in the Indian Patent Office, the entire disclosure of each of which is incorporated herein by reference.

BACKGROUND

1. Field

The disclosure relates generally to image processing, and more particularly, to a method and an apparatus for performing depth estimation of an object in a scene.

2. Description of Related Art

Various electronic devices, such as cameras, mobile phones, and other multimedia devices, are used for capturing an image of a scene. A depth map of a captured scene may be used in different applications, such as robotics, automotive sensing, medical imaging, and three-dimensional (3D) applications. A depth map is an image including information about a distance from a viewpoint to surfaces included in the scene.

Traditional camera systems have many processing bottlenecks with regard to depth estimation and active depth sensors, e.g., depth estimation in oversaturated regions, depth estimation under varied lighting conditions, and depth estimation for reflective and transparent objects.

For example, in a conventional complementary metal-oxide-semiconductor (CMOS) sensor and stereo setup for depth estimation, an accurate depth cannot be estimated in saturated image regions. Further, the conventional CMOS sensor cannot capture images of a scene at a high frame rate and with low power, which is not suitable for providing fast visual feedback.

In an advanced driver-assistance system (ADAS), an accurate depth map of a scene is necessary for obstacle detection. Further, the ADAS system should be able to operate under various lighting conditions and provide fast visual feedback to a user for proper navigation. However, a conventional CMOS sensor does not operate well under various lighting conditions and is unable to provide fast visual feedback to the user, which results in poor imaging characteristics of the depth map. Further, the conventional CMOS sensor requires higher bandwidth. For example, the conventional CMOS sensor can sample at the Nyquist rate, which requires more than 20 GBPS.

Thus, there is a need for a method and apparatus for performing accurate depth estimation of objects in a scene under various lighting conditions.

SUMMARY

The disclosure is provided to address at least the problems and/or disadvantages described above and to provide at least the advantages described below.

In accordance with an aspect of the disclosure, a method is provided for performing depth estimation of an object in an image by an electronic device. The method includes capturing the image of a scene by the electronic device; obtaining, by a sensor of the electronic device, from the image, pixel intensity data and event data; generating an event depth map using the event data, wherein the event data includes event map data of the image and event velocity data of the image; and generating a depth map for the object in the image using the event depth map and the pixel intensity data.

In accordance with an aspect of the disclosure, an apparatus is provided for performing depth estimation of an object in an image. The apparatus includes a camera configured to capture the image of a scene; a sensor configured to obtain pixel intensity data and event data from the image; and a processor configured to generate an event depth map using the event data, which includes an event map data of the image and an event velocity data of the image, and generate a depth map for the object using the event depth map and the pixel intensity data.

In accordance with an aspect of the disclosure, a non-transitory computer readable medium is provided for storing instructions thereon, which when executed, instruct at least one processor to perform a method. The method includes capturing the image of a scene by an electronic device; obtaining, by a sensor of the electronic device, from the image, pixel intensity data and event data; generating an event depth map using the event data, wherein the event data includes event map data of the image and event velocity data of the image; and generating a depth map for the object in the image using the event depth map and the pixel intensity data.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
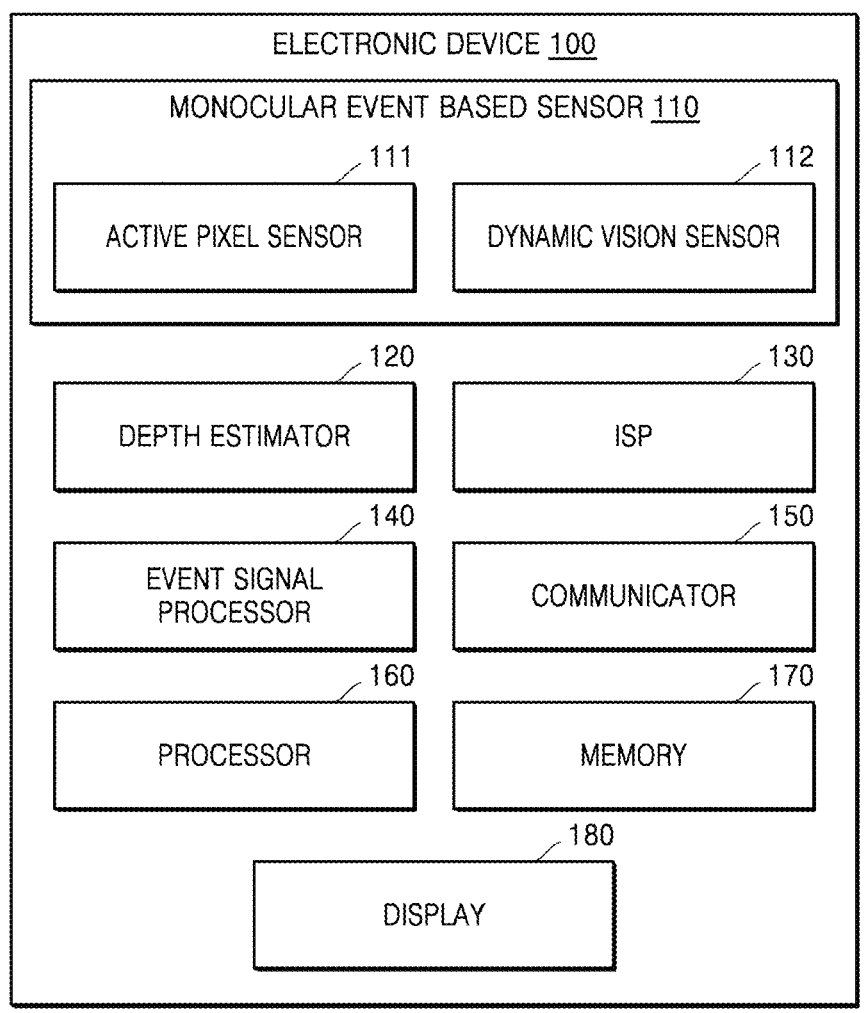
FIG. 1A illustrates an electronic device for performing depth estimation of an object in a scene, according to an embodiment.

The following description with reference to the accompanying drawings is provided to assist in a comprehensive understanding of various embodiments of the disclosure as defined by the claims and their equivalents. It includes various specific details to assist in that understanding, although these specific details are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but are used by the inventor to convey a clear and consistent understanding of the disclosure. Accordingly, those skilled in the art will understand that the following description of various embodiments of the disclosure is provided for illustration purpose only and not for the purpose of limiting the disclosure as defined by the appended claims and their equivalents.

Herein, singular forms, such as "a," "an," and "the", include plural referents unless the context clearly dictates otherwise. Thus, for example, a reference to "a component surface" includes reference to one or more of such surfaces.

The various embodiments described herein are not necessarily mutually exclusive, as some embodiments can be combined with one or more other embodiments to form new embodiments.

Herein, the term "or" refers to a non-exclusive or, unless otherwise indicated.

The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is customary in the art of the disclosure, embodiments may be described and illustrated in terms of blocks that carry out a described function or functions. These blocks, which may be referred to herein as managers, engines, controllers, units, modules, etc., are physically implemented by analog and/or digital circuits, such as logic gates, integrated circuits, microprocessors, microcontrollers, memory circuits, passive electronic components, active electronic components, optical components, hardwired circuits, etc., and may optionally be driven by firmware and software. The circuits may be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block.

Each block of the embodiments may be physically separated into two or more interacting and discrete blocks without departing from the scope of the disclosure. Likewise, the blocks of the embodiments may be physically combined into more complex blocks without departing from the scope of the disclosure.

In accordance with an embodiment, a method and an apparatus are provided for performing depth estimation of an object in a scene.

A sparse event depth map may be generated by processing event data of the scene.

A dense depth map for an object in a scene may be created by combining a sparse event depth map with a stream of pixel intensity data of the scene.

A spatio-temporal two-dimensional (2D) event map and an event intensity image may be generated by processing event map data of an image of a scene.

A sparse event depth map may be generated by processing the spatio-temporal 2D event map, event velocity data, and/or a rotation degree of a capturing device of an electronic device and translation estimation data of a sensor. The sensor may be a monocular event based sensor of the electronic device.

A stream of pixel intensity data of a scene may be processed with event data to obtain a high quality red, green, and blue (RGB) image of a scene.

An intermediate depth map may be generated by using a generated sparse depth along with an event intensity image of a scene.

A dense depth map may be created by combining an intermediate depth map with a high quality RGB image of a scene.

A timing synchronization and timing correction of event data are performed with respect to a stream of pixel intensity data of a scene.

In accordance with an embodiment, a method is provided for performing depth estimation of an object in a scene, by using an electronic device. The method includes capturing an image of the scene by the electronic device and obtaining, by the electronic device, scene data, i.e., input data of the scene from the sensor, where the input data comprises a stream of pixel intensity data of the scene and an event data of the scene. The sensor may be a monocular event based sensor. The method further includes generating, by the electronic device, a sparse event depth map by processing the event data of the scene, where the event data of the scene comprises an event map data and an event velocity data, and generating, by the electronic device, a dense depth map for the object in the scene by fusing the sparse event depth map with the stream of pixel intensity data of the scene.

Unlike conventional methods and systems, a method in accordance with an embodiment may be used to perform depth estimation under various lighting conditions and in relation to reflective surfaces. For example, a method of the disclosure may also be used to perform more accurate 3D reconstruction of a scene by combining CMOS image sensor data with event sensor data by using a single sensor (such as a monocular event based sensor).

A method of the disclosure may be used to capture more information about a scene because of a superior dynamic range of a monocular event based sensor, thus providing more information in a saturated region of the scene.

Unlike conventional methods and systems, a method of the disclosure may be used to perform accurate depth estimation using timing synchronization of the CMOS image sensor data and event data. For example, a low power wearable vision device, such as an augmented reality (AR)-smart glass, a human-robot interaction (HRI) device, etc., may perform accurate depth estimation of a scene using timing synchronization of the CMOS image sensor data with the event data.

Unlike conventional methods and systems, a method of the disclosure may be used to reduce dynamic random access memory (DRAM) bandwidth of a monocular event based sensor by using a dynamic temporal event context rate based on frequency scaling. Accordingly, low latency processing based on reduced bandwidth may be obtained.

A method of the disclosure may be used to generate a depth map with high accuracy using a single sensor such as the monocular event based sensor. Also, an accurate depth map may be generated without compromising power consumption and the performance of an electronic device using the method.

FIG. 1A illustrates an electronic device for performing depth estimation of an object in a scene, according to an embodiment.

Referring to FIG. 1A, the electronic device 100 may be, but is not limited to, a smartphone, a drone, a mobile robot, an autonomous vehicle, a smart watch, a laptop, a mobile phone, a head mounted display, a personal digital assistant (PDA), a tablet, a phablet, or any other electronic device including an image capturing device. The electronic device 100 includes a monocular event based sensor 110, a depth estimator 120, an image signal processor (ISP) 130, an event signal processor (ESP) 140, a communicator 150, a processor 160, a memory 170, and a display 180. The depth estimator 120, the ISP 130, the ESP 140, the communicator 150, and the processor 160 may be implemented as at least one hardware processor.

The monocular event based sensor 110 may be configured to capture an image of a scene. The scene may be, but is not limited to, a 2D scene or a 3D scene.

The monocular event based sensor 110 may be, but is not limited to, a camera, an RGB camera, a charge coupled device (CCD) or CMOS sensor, etc.

The monocular event based sensor 110 includes an active pixel sensor (APS) 111 and a dynamic vision sensor (DVS) 112. The APS 111 may be configured to obtain a stream of pixel intensity data of the scene. The DVS 112 may be configured to obtain the event data of the image. The monocular event based sensor 110 may be configured to track a motion change in the image of the scene, i.e., a change in an intensity of pixels in the image of the scene.

The monocular event based sensor 110 may be configured to perform a function of a depth sensor capable of obtaining depth information of the object in the 3D image of the scene, and a function of a motion sensor capable of acquiring motion information by detecting a motion of the object in the 3D image of the scene.

Figure 1B:
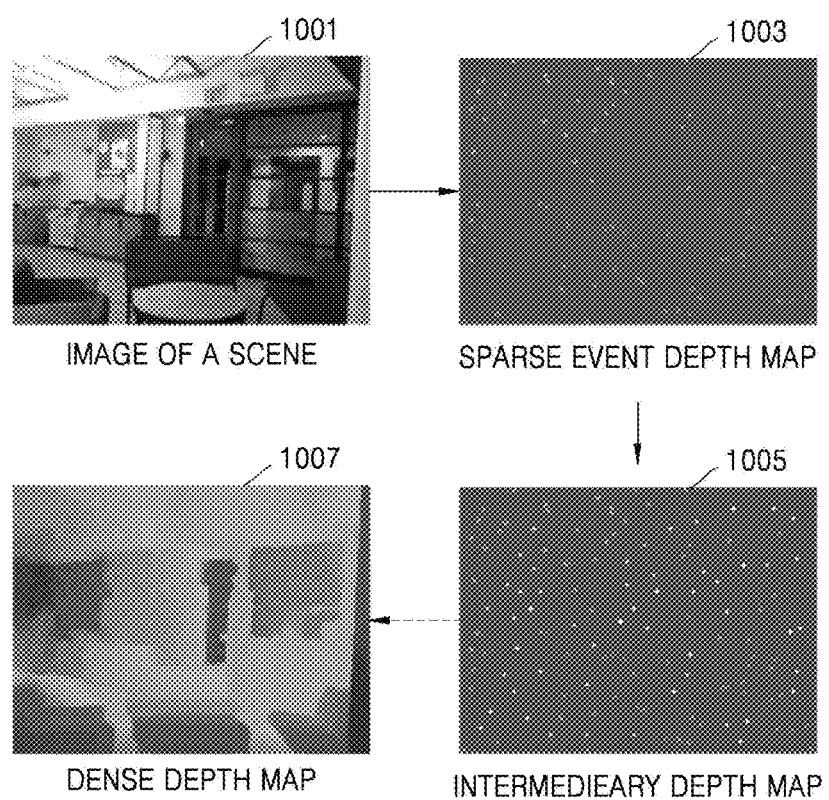
FIG. 1B illustrates a sparse depth map and a dense depth map according to an embodiment.

The monocular event based sensor 110 may obtain scene data while capturing an image of the scene using a capturing device, such as a camera of the electronic device 100. The scene data may include a stream of pixel intensity data of the scene and event data of the scene. FIG. 1B illustrates a sparse event depth map and a dense depth map according to an embodiment.

Throughout the specification, the terminology "a sparse event depth map" may be used interchangeably with an event depth map, a sparse dense depth map, or a sparse depth map. Likewise, the terminology "a dense depth map" may be used interchangeably with a depth map or a dense map throughout the specification.

Referring to FIG. 1B, the event signal processing engine 140 may generate the sparse event depth map by processing the event data of the image. Typically, depth estimation involves two kinds of depths. One is a sparse depth which is a depth known as only a subset of the 2D image. The sparse event depth map 1003 may be depicted with a plurality of spots obtained from an image of the scene 1001. The dense depth map 1007, on the other hand, may be depicted with various depths known for an entire 2D image. The same color of the dense depth map indicates the same or substantially the same depth from the image of the scene 1001 which is a 2D image.

An intermediary dense depth map 1005 may be obtained using the sparse event depth map 1003 and the pixel intensity. Throughout the specification, the terminology "intermediary dense depth map" may be used interchangeably used with an intermediary map, a semi dense depth map, or an intermediary depth map.

The event data of the image may include event map data and event velocity data of the image of the scene. The event map data is the data generated by accumulating the event data in an address event representation (AER) format over a certain period of time and thereby generating a spatio-temporal 2D event map of the event data. The event velocity data refers to a predictive velocity of each event using optical flow.

The event signal processing engine 140 may generate the spatio-temporal 2D event map and an event intensity image using the event map data of the image.

Figure 1C:
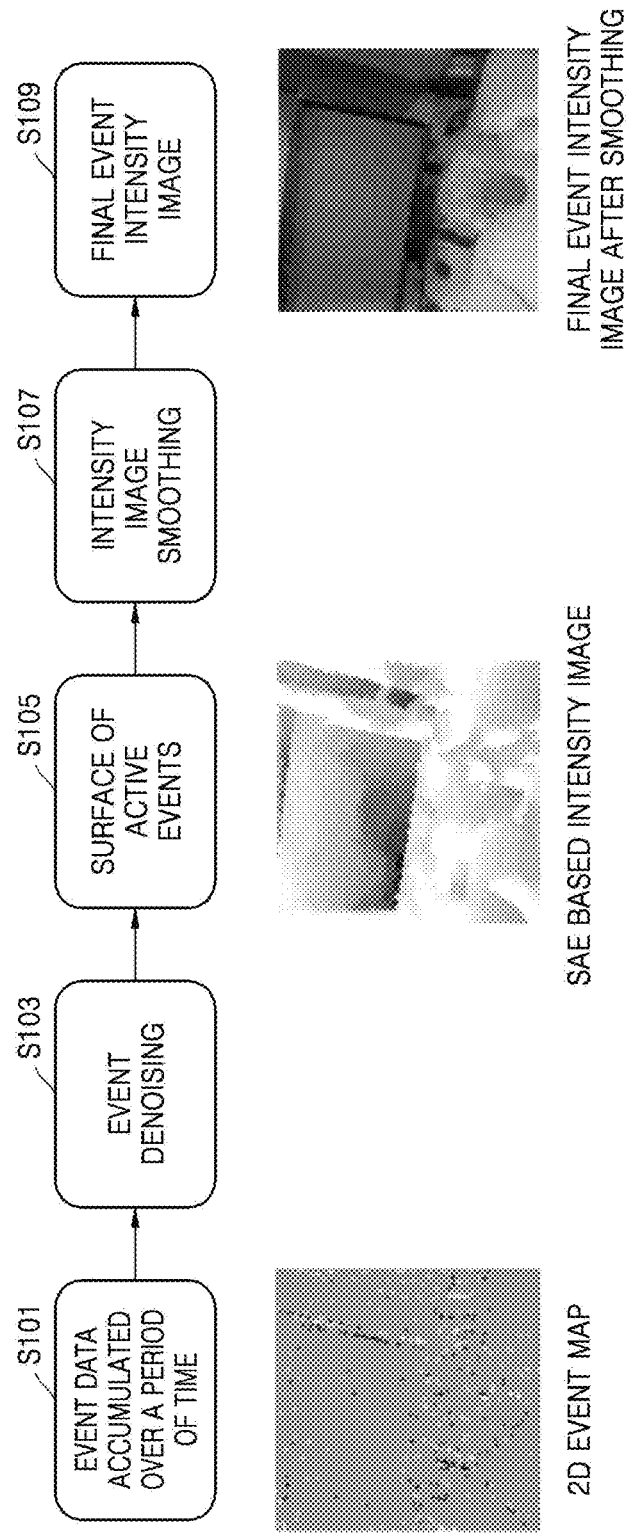
FIG. 1C is a flowchart illustrating a method of obtaining an event intensity image according to an embodiment.

FIG. 1C is a flowchart illustrating a method of obtaining an event intensity image according to an embodiment.

Referring to FIG. 1C, in step S101, event data is accumulated over a certain period of time, e.g., 30 ms.

In step S103, an event de-noising process is applied to the accumulated event data.

In step S105, a surface of active events (SAE) is generated. The SAE is a 3D domain including the two dimensional sensor frames and an additional dimension representing time.

In step S107, intensity image smoothing is used to refine the initially reconstructed event intensity image by applying a smoothing function to the SAE.

In step S109, the final event intensity image is obtained after applying the smoothing function.

The event signal processing engine 140 may generate the sparse event depth map using the spatio-temporal 2D event map, the event velocity data, and a degree of camera rotation and translation estimation data of the monocular event based sensor 110. For example, the sparse event depth map may be distributed along edges of the image. The depth may indicate a relative distance between objects included in a scene and a capturing device, such as a camera.

The event signal processing engine 140 may process a stream of pixel intensity data of the image of the scene and thereby obtain a high quality RGB image from the captured image of the scene, when the event data is processed. The event signal processing engine 140 may generate an intermediate depth map using the generated sparse depth along with the pixel intensity data. Generally, the pixel intensity data may be obtained by interpolating accumulated event data.

Using the estimated pixel intensity, the sparse event depth map may be propagated to neighborhood regions. That is, regions that do not have depth information may be filled with an estimated pixel intensity in order to generate an intermediary depth map. The intermediary depth map may also be referred to as a semi-dense (event) depth map.

The depth estimator 120 may generate a dense depth map by combining the intermediate depth map with the high quality RGB image. The dense depth map may be generated by post processing the intermediate depth map.

The depth estimator 120 may generate the dense depth map for the object in the image by combining the intermediate depth map with the high quality RGB image of the scene using a guided surface fitting process. Since the color, texture, and structure information about the objects in the scene are incomplete from the estimated event intensity, object information from the high quality RGB image from the scene may be used to refine the intermediary event depth map.

The ISP 130 may be configured to perform the image signal processing using the guided surface fitting technique for creating the dense depth map.

The ISP 130 may perform timing synchronization and timing correction of the event data with respect to the stream of pixel intensity data of the scene.

The ESP 140 may be configured to perform frequency scaling for depth estimation circuitry of the electronic device 100 in order to determine an operational frequency for maintaining a balance between power and performance of the electronic device 100, wherein the frequency scaling is performed based on the scene data rate and a maximum throughput of the electronic device. The maximum throughput indicates a maximum amount of information the electronic device 100 can process during a given amount of time. The operational frequency refers to a clock frequency at which digital hardware blocks or digital hardware circuitry work. The frequency scaling is used for controlling the clock frequency to match the performance required and the power consumed.

The communicator 150 may be configured to communicate internally with hardware components in the electronic device 100. The processor 160 may be coupled to the memory 170 for processing various instructions stored in the memory 170 to perform depth estimation of the object in the image of the scene using the electronic device 100.

The memory 170 may be configured to store instructions to be executed by the processor 160. Further, the memory 170 may be configured to store image frames of the 3D scene. The memory 170 may include non-volatile storage elements, such as magnetic hard discs, optical discs, floppy discs, flash memories, or forms of electrically programmable memories (EPROM) or electrically erasable and programmable (EEPROM) memories.

In addition, the memory 170 may be a non-transitory storage medium. The term "non-transitory" may indicate that the storage medium is not embodied in a carrier wave or a propagated signal. However, the term "non-transitory" should not be interpreted in the sense that the memory 170 is non-movable. The non-transitory storage medium may store data that may, over time, change (e.g., random access memory (RAM) or cache).

The memory 170 may be configured to store larger amounts of information.

The display 180 may be configured to display a captured image of the 3D scene. The display 180 may include a touch screen display, an AR display, a virtual reality (VR) display, etc.

Although various hardware components of the electronic device 100 are illustrated in FIG. 1A, the embodiments of the disclosure are not limited thereto. For example, the electronic device 100 may include fewer or more components than illustrated in FIG. 1A. Two or more the components may be combined together to perform the same or a substantially similar function to perform depth estimation of the object in the scene.

Further, the labels or names of the components illustrated in FIG. 1A are used only for illustrative purpose only and do not limit the scope of the disclosure.

Figure 1D:
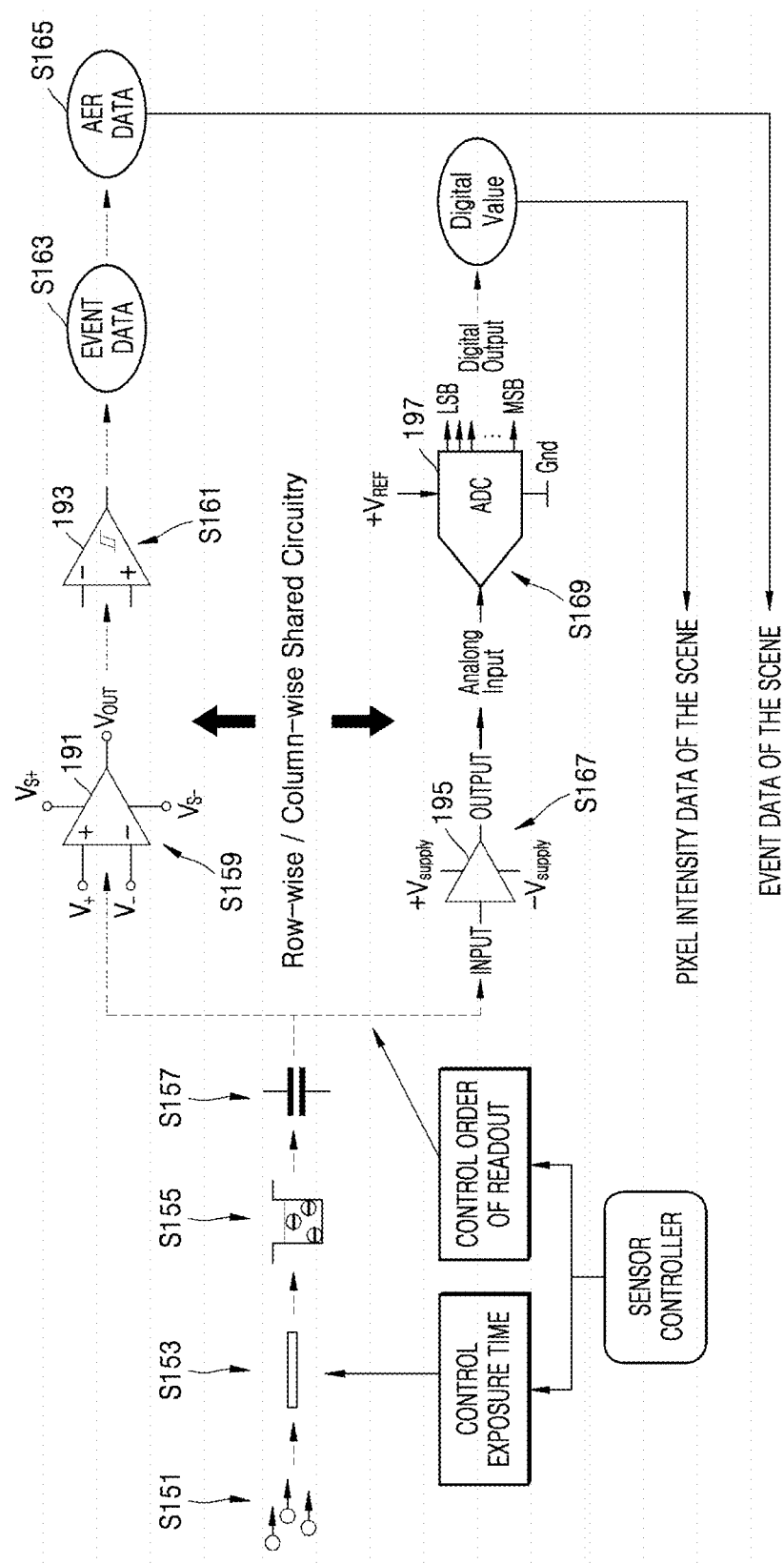
FIG. 1D illustrates a method of obtaining scene data according to an embodiment.

FIG. 1D illustrates a method for obtaining scene data according to an embodiment.

Referring to FIG. 1D, when a camera captures a scene, multiple photons are reflected from the scene in step S151, and the reflected multiple photons fall on a plurality of pixel arrays in step S153.

In step S155, each pixel may release several electron hole pairs depending upon the wavelength of photons. The charge formed with the electron hole pairs may be transformed into a voltage using an electric component, such as a capacitor, in step S157.

In step S159, the voltage is compared with a previously stored voltage using a first comparator 191.

The output of the comparator 191, which indicates the voltage difference that may translate into an intensity difference, is compared with a predetermined threshold value by a second comparator 193 in step S161.

The output of the second comparator 193 may be an on/off signal, which may be an event data, in step S163.

In step S165, a timestamp is attached to the event data and the event data may be converted into AER data in an AER format. The event data may represent a change in the intensity of pixels in the image of the scene. That is, the image representing the scene may be divided into multiple units, which are referred to as "pixels". Each of the plurality of pixels in the image may represent a discrete area and has an associated intensity value. A pixel may appear very dark with low intensity in grayscale and very light with high intensity.

In step S167, the voltage output associated with the step S157 may be amplified using an amplifier 195. The amplified voltage may be inputted into an analog-digital converter (ADC) 197 in step S169 in order to generate a digital value representing the pixel intensity of the scene.

The event data may have the format of a time sequence of an event e(n) from the monocular event based sensor 110, as shown in Equation (1) below.

$$e(n) = \{x^n, y^n, \Theta^n, t^n\} \quad (1)$$

In Equation (1), x and y refer to coordinates of the pixel, $\Theta$ refers to the polarity of the event, i.e., positive or negative, and t refers to the timestamp of an event trigger. A positive $\Theta$ indicates that at the corresponding pixel, the intensity has increased by a certain threshold $\Delta + > 0$ in a log intensity space. A negative Θ indicates a drop of intensity by a second threshold Δ->0 in the log intensity space.

Figure 2:
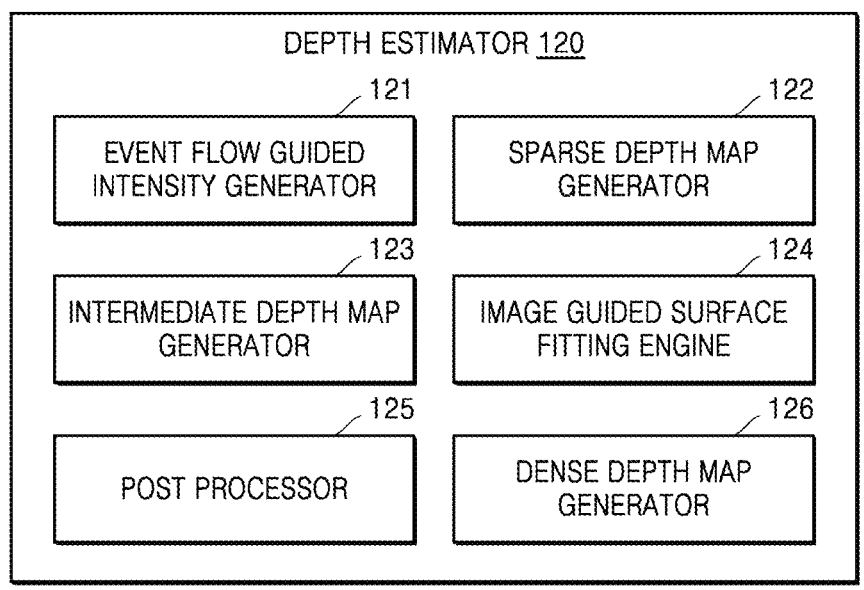
FIG. 2 illustrates a depth estimation engine of an electronic device for performing depth estimation of an object in a scene, according to an embodiment.

FIG. 2 illustrates a depth estimator of an electronic device for performing depth estimation of an object in an image of a scene, according to an embodiment.

Referring to FIG. 2, the depth estimator 120 includes an event flow guided intensity generator 121, a sparse depth map generator 122, an intermediate depth map generator 123, an image guided surface fitting engine 124, a post processor 125, and a dense depth map generator 126. The depth estimator 120 may be implemented as at least one hardware processor.

The event flow guided intensity generator 121 may generate the intensity data from the event data of the monocular event based sensor 110. The sparse depth map generator 122 may generate the sparse event depth map using the event data of the image of the scene. The sparse depth map generator 122 may generate the spatio-temporal 2D event map and the event intensity image by processing the event map data of the image of the scene. Further, the sparse depth map generator 122 may generate the sparse event depth map by processing the spatio-temporal 2D event map, the event velocity data, and a degree of camera rotation and translation estimation data of the monocular event based sensor 110. The sparse event depth map may be distributed along edges of the image of the scene.

The intermediate depth map generator 123 may simultaneously process a stream of pixel intensity data of the image to obtain a high quality RGB image of the scene, when the event data is processed. The intermediate depth map generator 123 may generate an intermediate depth map by using the generated sparse depth along with an event intensity image of the scene.

The image guided surface fitting engine 124 may create the dense depth map for the object in the image by fusing or combining the intermediate depth map with the high quality RGB image from the scene using a guided surface fitting process.

The post processor 125 may perform post processing/depth smoothing for post processing the intermediate depth map to generate the dense depth map.

The dense depth map generator 126 may create the dense depth map by fusing or combining the intermediate depth map with the high quality RGB image. The dense depth map may be created by post processing the intermediate depth map.

The dense depth map generator 126 may generate the dense depth map for the object in the image by fusing or combining the intermediate depth map with the high quality RGB image using the guided surface fitting process. The guided surface fitting process may be used to find the best fit line or surface for a series of data points using both the high quality RGB image and event data.

Figure 3A:
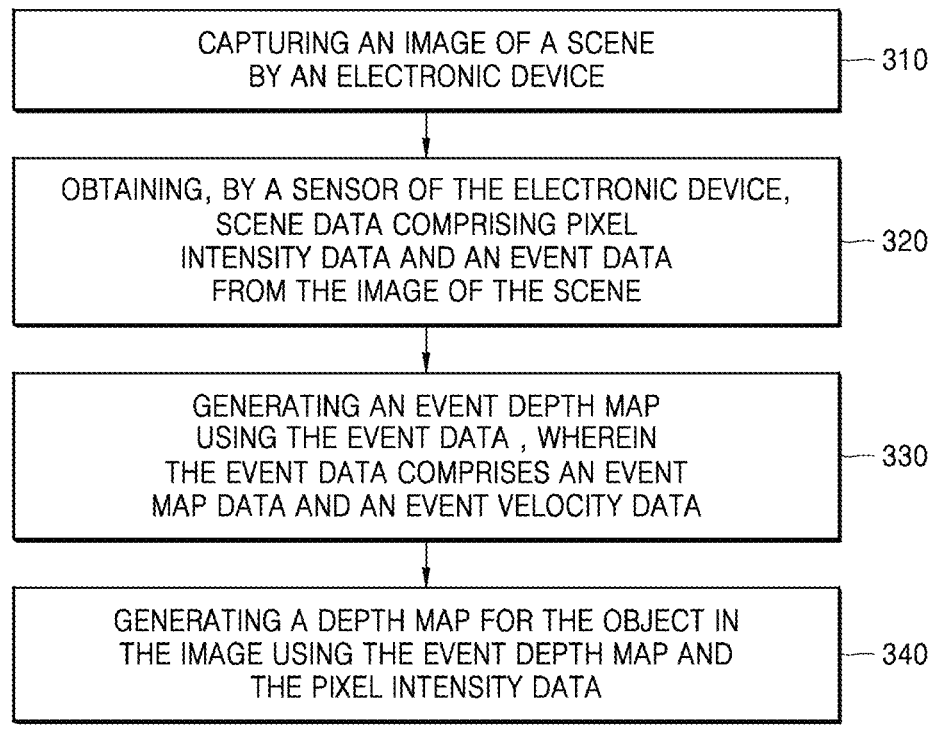
FIG. 3A is a flowchart illustrating device method for performing depth estimation of an object in a scene, according to an embodiment.

FIG. 3A is a flowchart illustrating device method for performing depth estimation of an object in a scene, according to an embodiment.

Referring to FIG. 3A, the operations therein, i.e., steps 310-340, may be performed by a processor or particularly, the depth estimator 120 of the electronic device 100.

In step 310, the electronic device 100 captures an image of a scene. The capturing may be performed by a camera or a capturing device of the electronic device 100.

In step 320, the electronic device obtains scene data of the image by a sensor, e.g., the monocular event based sensor 110 of the electronic device 100.

In step 330, the electronic device 100 generates a sparse event depth map by using the event data of the image. The event data may include an event map data and an event velocity data of the image of the scene.

To generate the sparse event depth map, other information such as the camera orientation may be used with the event data of the captured image. The relative position of the camera or the capturing device in capturing the image of the scene and the flow of the event between accumulated image frames captured by the camera or the capturing device can assist in estimating the depth of the scene. Since the events are available on at certain pixels, specifically along edges in the image of the scene, the generated event map is sparse.

In step 340, the electronic device 100 generates a dense depth map for the object in the image using the sparse event depth map and a stream of pixel intensity data. The dense depth map may be generated by fusing or combining the sparse event depth map and the stream of pixel intensity data of the image of the scene.

Although various steps, actions, acts, blocks, etc., in the flowchart of FIG. 3A are illustrated in a particular order, the may be performed in a different order, or simultaneously. Further, some of the steps, actions, acts, blocks, etc., may be omitted, added, modified, or skipped, without departing from the scope of the disclosure.

Figure 3B:
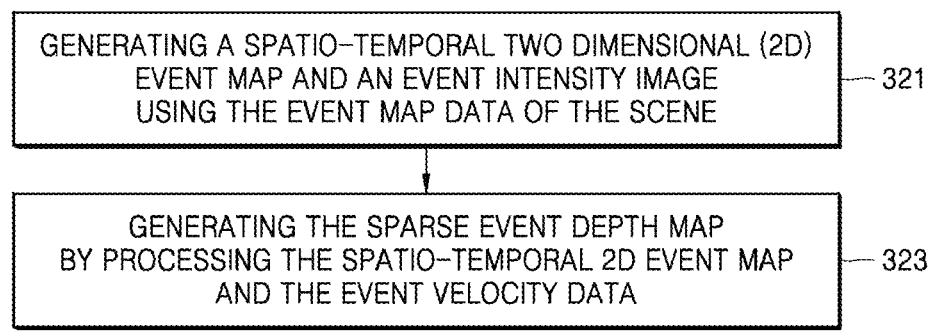
FIG. 3B is a flowchart illustrating a method for generating a sparse event depth map, according to an embodiment.

FIG. 3B is a flowchart illustrating a method for generating a sparse event depth map, according to an embodiment.

Referring to FIG. 3B, in step 321, the electronic device 100 generates the spatio-temporal 2D event map and/or the event intensity image by processing the event map data of the image of the scene. The sparse depth map generator 122 may generate the spatio-temporal 2D event map and/or the event intensity image using the event map data of the image.

In step 323, the electronic device 100 may generate the sparse event depth map by processing the spatio-temporal 2D event map and the event velocity data. The sparse event depth map may be generated using the spatio-temporal 2D event map, the event velocity data. A rotation degree of a capturing device, e.g., a camera, of the electronic device 100 and translation estimation data of the monocular event based sensor 110 may be also used to generate the sparse event depth map. The sparse event depth map may be distributed along edges of the image. The sparse depth map generation engine 122 may generate the sparse event depth map using the foregoing processing.

Although various steps, actions, acts, blocks, etc., in the flowchart of FIG. 3B are illustrated in a particular order, the may be performed in a different order, or simultaneously. Further, some of the steps, actions, acts, blocks, etc., may be omitted, added, modified, or skipped, without departing from the scope of the disclosure.

Figure 3C:
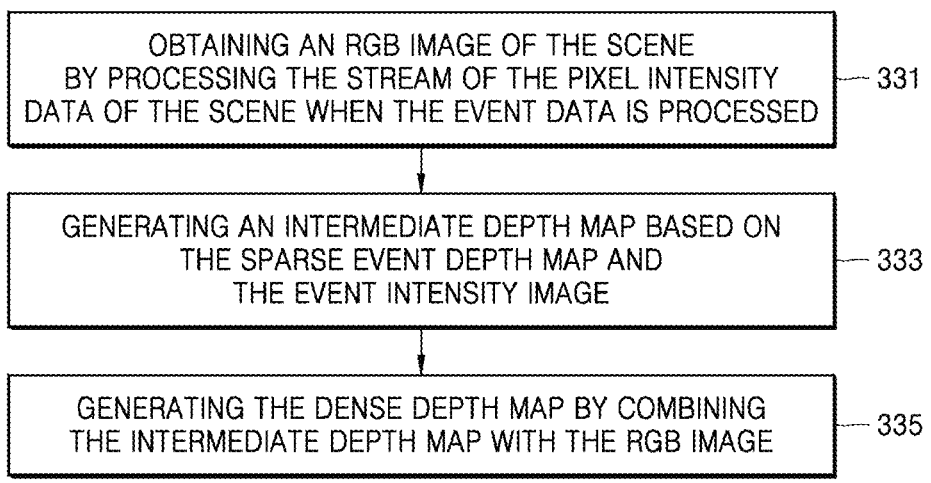
FIG. 3C is a flowchart illustrating a method for creating a dense depth map, according to an embodiment.

FIG. 3C is a flowchart illustrating a method for creating a dense depth map, according to an embodiment.

Referring to FIG. 3C, in step 331, the electronic device 100 obtains a high quality RGB image from an image of a scene by simultaneously process a stream of pixel intensity data of the image when the event data is processed. The ISP 130 simultaneously processes the stream of pixel intensity data of the image to obtain the high quality RGB image from the image of the scene when the event data is processed.

In step 333, the electronic device 100 generates an intermediate depth map based on the sparse event depth map with the event intensity image. The intermediate depth map generator 123 may generate the intermediate depth map using the generated sparse event depth map along with the event intensity image of the scene.

In step 335, the electronic device 100 generates the dense depth map by combining or fusing the intermediate depth map with the high quality RGB image of the scene. The dense depth map generator 143 may generate the dense depth map by combining or fusing the intermediate depth map with the high quality RGB image.

Although various steps, actions, acts, blocks, etc., in the flowchart of FIG. 3C are illustrated in a particular order, the may be performed in a different order, or simultaneously. Further, some of the steps, actions, acts, blocks, etc., may be omitted, added, modified, or skipped, without departing from the scope of the disclosure.

Figure 4:
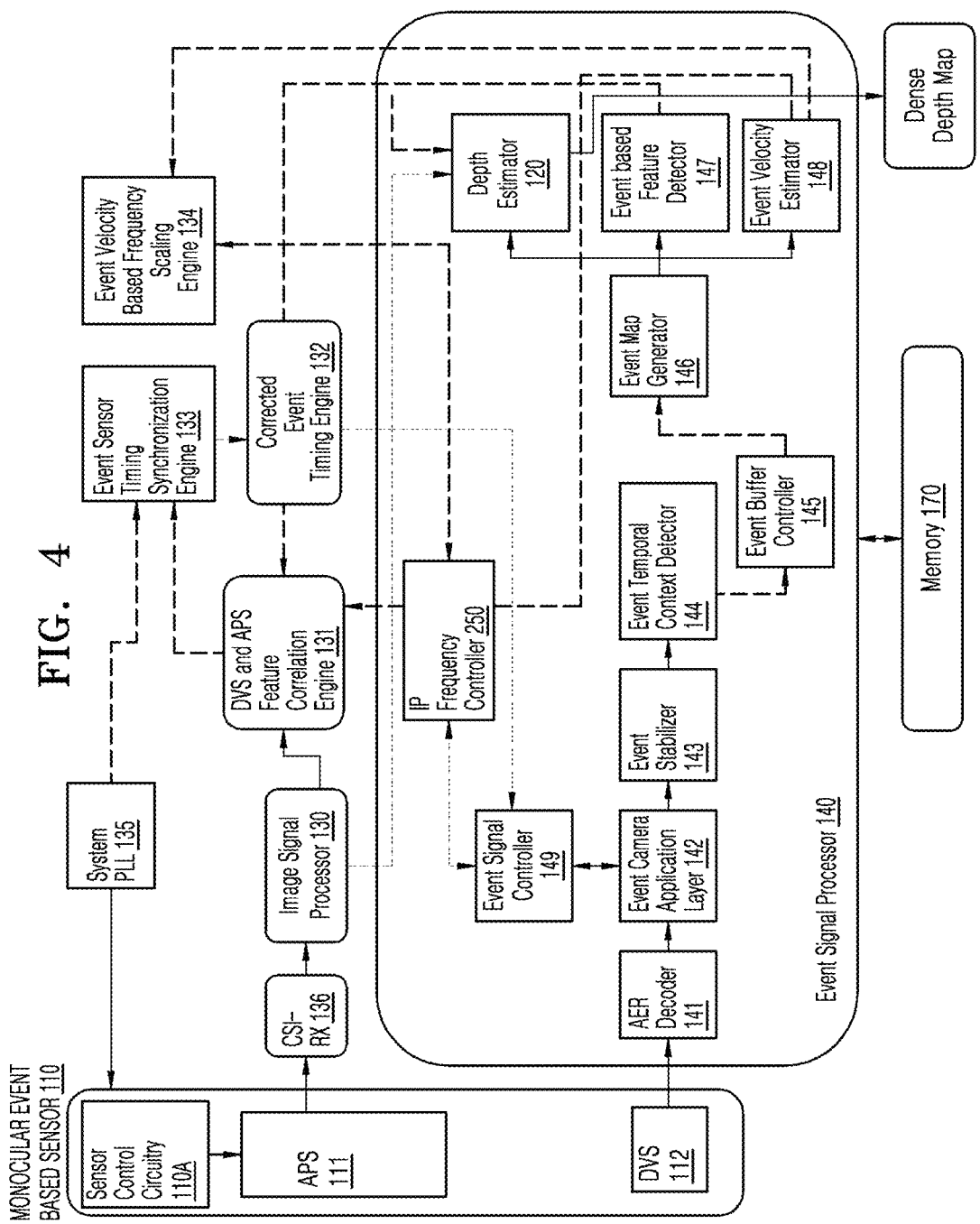
FIG. 4 is a process flow diagram illustrating an electronic device performing a depth estimation of an object in a scene, according to an embodiment.

FIG. 4 is a process flow diagram illustrating an electronic device performing depth estimation of an object in a scene, according to an embodiment.

Referring to FIG. 4, the APS 111 may be, but is not limited to, a CMOS image sensor that may receive light and convert the received light into a digital pixel value depending on light intensity. The sensor control circuitry 110A may be, but is not limited to, a controller circuit that may be used to modify sensor parameter settings such as, an exposure time, frame rate, etc.

The system phase locked loop (PLL) 135 may be a control system that generates an output signal, a phase of the output signal being related to a phase of an input signal. The system PLL 135 may be an application processor silicon on chip (AP SoC).

A CSI receiver (CSI Rx) 136 on the AP SoC may receive APS data via the CSI D-Phy. Further, the ISP 130 may be used to enhance the quality of the APS data.

A DVS and APS feature correlation engine 131 may be configured to perform a feature correlation between the DVS data and the APS data. A corrected event timing engine 132 may be configured to perform the timing synchronization and timing correction of the event data with respect to the stream of pixel intensity data of the scene.

An event velocity based frequency scaling engine 134 may be configured to perform frequency scaling for a depth estimation circuitry of the electronic device 100 and to determine an operational frequency of the electronic device 100 for maintaining a balance between the power and the performance, wherein the frequency scaling is performed based on an input data rate and a maximum throughput of the electronic device.

An event sensor timing synchronization engine 133 may be configured to perform the timing synchronization of the event data.

An ESP 140 may include an AER bus decoder 141, an event camera application layer 142, an event stabilizer 143, an event temporal context detector 144, an event signal controller 149, an event buffer controller 145, an event map generator 146, an event based feature detector 147, and an event velocity estimator 148.

The AER Decoder 141 may receive the event data from the DVS and change the event data from one clock domain (AER decoder 141) to another domain (event signal controller 149). The event camera application layer 142 may receive data from the AER decoder 141 and interface with an event signal controller 149. The event camera application Layer 142 may also be used to filter out noise from the event data.

The event stabilizer 143 may fuse a pose (or orientation) received from a sensor hub (e.g., an inertial measurement unit (IMU) or other directional sensors) and stabilize the event data with respect to sensor motion. The event temporal context detector 144 may determine the validity of an event over a time slice and determine an average accumulation time of the event data.

The event signal controller 149 may control the event timing of event data and digital intellectual property (IP) frequency control 250 of the event signal processor 140. Herein, digital IP may be referred to as "IP".

The event buffer controller 145 may manage a queue of accumulated event frames and handle internal memory requests.

The event map generator 146 may create a spatial 2D event map from the individual pixel event data. The event velocity estimator 148 may measure the velocity of an event via particle tracking or other techniques. The event based feature detector 147 may extract binary features from the event map.

The depth estimator 120 may receive the data from the ISP 130, the corrected event timing engine 132, and the event velocity estimator 148. The depth estimator 120 may create the depth map of the object in an image of a scene by combing the data received from the ISP 130, the corrected event timing engine 132, and the event velocity estimator 148.

Figure 5:
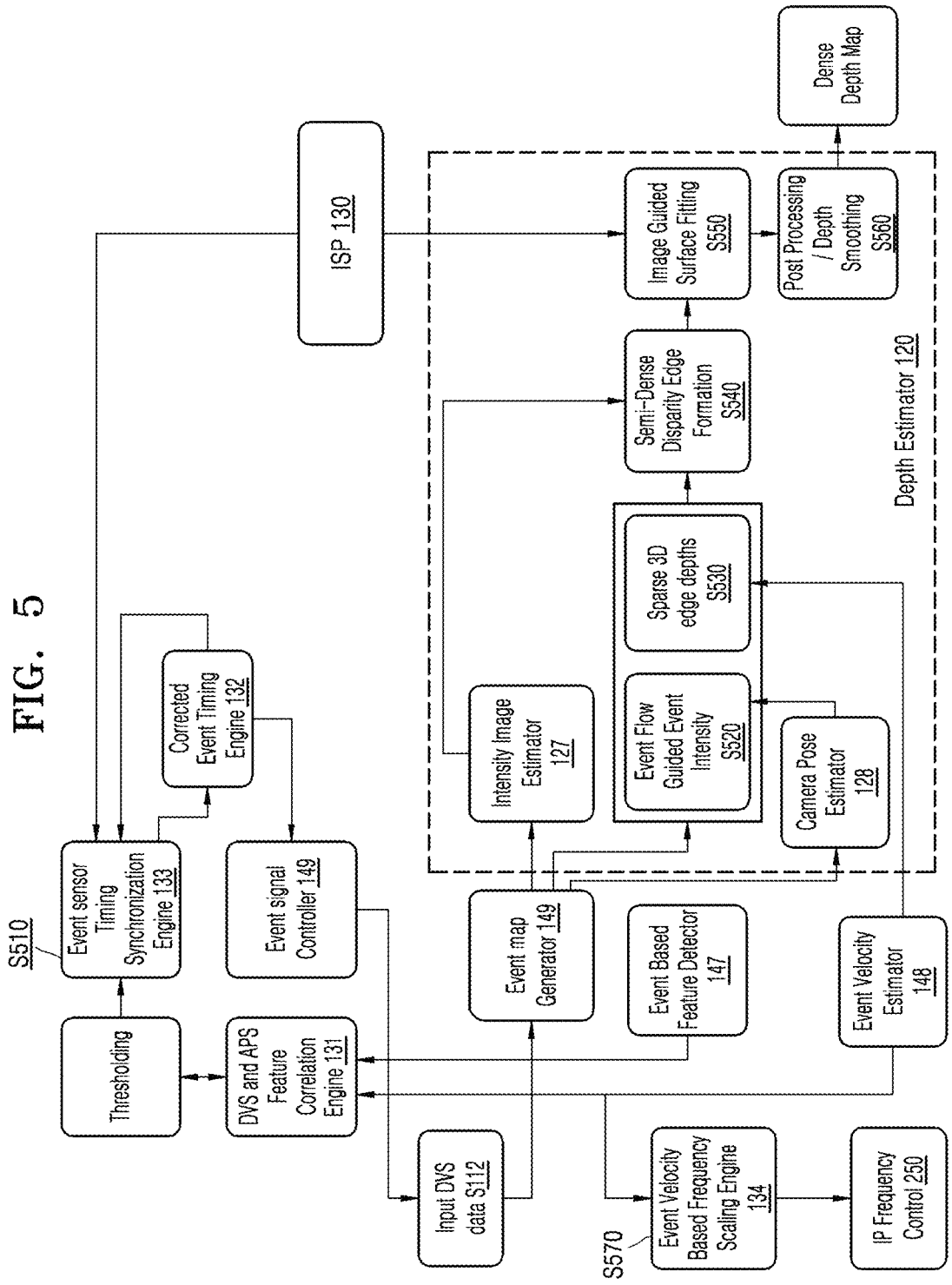
FIG. 5 is a process flow diagram illustrating an electronic device performing a depth estimation of an object in a scene, according to an embodiment.

FIG. 5 is a process flow diagram illustrating an electronic device performing depth estimation of an object in an image of a scene, according to an embodiment.

Referring to FIG. 5, in step S510, the Event sensor timing synchronization engine 133 receives an input and transmits an output as follows.

Input: event velocity information, DVS event map, nearest time-slice RGB image, system PLL clock information, RGB image V-Sync information, previous corrected event timing (from the $2^{nd}$ frame onwards, for first frame a constant is assumed).

Output: corrected event timing (with respect to the event signal controller).

In step S520, the depth estimator 120 receives an input and transmits an output as follows.

Input: event map, estimated camera pose, event velocity

Output: event intensity image

In step S530, the depth estimator 120 receives an input and transmits and output as follows.

Input: event intensity image using the guided event intensity generation engine

Output: sparse 3D edge based depth data

In step S540, the depth estimator 120 receives an input and transmits an output as follows.

Input: sparse 3D edge based depth data from step 530

Output: intermediary dense depth map using event sensor data

In step S550, the depth estimator 120 receives an input and transmits an output as follows.

Input: RGB image from the ISP 130, intermediary dense depth map from step S540

Output: dense depth map from the combined RGB and event based data

In step S560, the depth estimator 120 receives an input and transmits an output as follows.

Input: depth map from step S550

Output: post processed smoothened dense depth map

In step S570, the event velocity based frequency scaling engine 134 performs frequency scaling for a depth estimation circuitry of the electronic device 100 to determine the operational frequency of the electronic device 100 for maintaining the balance between power and performance. The frequency scaling is performed based on an input data rate and a maximum throughput of the electronic device 100.

Figure 6:
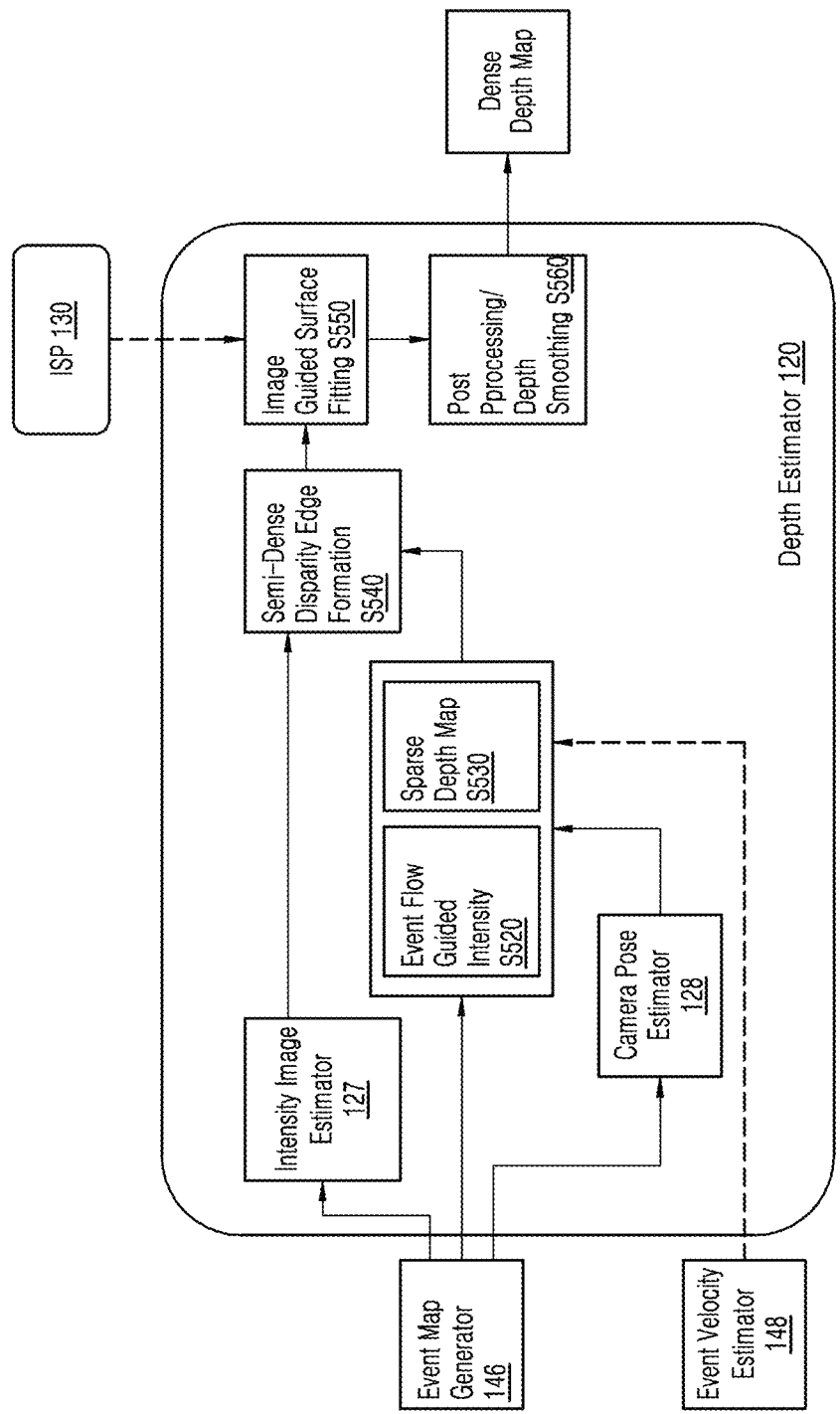
FIG. 6 is a process flow diagram illustrating an electronic device performing a depth estimation of an object in a scene, according to an embodiment.

FIG. 6 is a process flow diagram illustrating an electronic device performing depth estimation of an object in a scene, according to an embodiment.

Referring to FIG. 6, the depth estimator 120 may perform depth estimation of an image of a scene with respect to saturated regions of the scene or under various lighting conditions of the scene. During image capturing, for every scene, the monocular event based sensor 110 may output pixel intensity data and event data (which represent positive or negative changes in pixel intensity). The event data is processed in order to generate a sparse depth map. The sparse depth map is processed to form an intermediate depth map. The pixel intensity data is processed in parallel by the ISP 130 in order to obtain a high quality RGB image.

A guided surface fitting is applied on the intermediate depth map and the RGB image in order to obtain a dense depth map that represents more accurate depth of objects than the intermediary depth map. Thereafter, post processing, such as depth smoothing, and a hole filling are applied. The output will be a dense, accurate depth map with the highest possible video resolution of the electronic device 100.

Unlike traditional stereo or active depth estimation methods, the event based depth estimation of the disclosure is dependent on the camera/object motion. Further, the low data rate makes the depth estimation similar to real time depth measurement, which is efficient for vision applications of wearable devices. In conventional methods, a pair of event sensor cameras are used to capture the depth of a scene. Unlike conventional methods, the method may capture depth information of a scene using a single monocular event based sensor 110.

Further, no calibration or rectification is required for the monocular event based sensor 110 for depth measurement. The CMOS and DVS sensor output is synchronized by the event sensor timing synchronization engine 133 of the disclosure. The event sensor based depth estimation disclosed herein produces a sparse depth map, wherein information is distributed majorly along object edges. Consequently, surface reflectivity does not affect the depth measurement accuracy as in the case of stereo or active depth estimation. The image data from the APS 111 is used to obtain a dense depth map of the scene.

Figure 7:
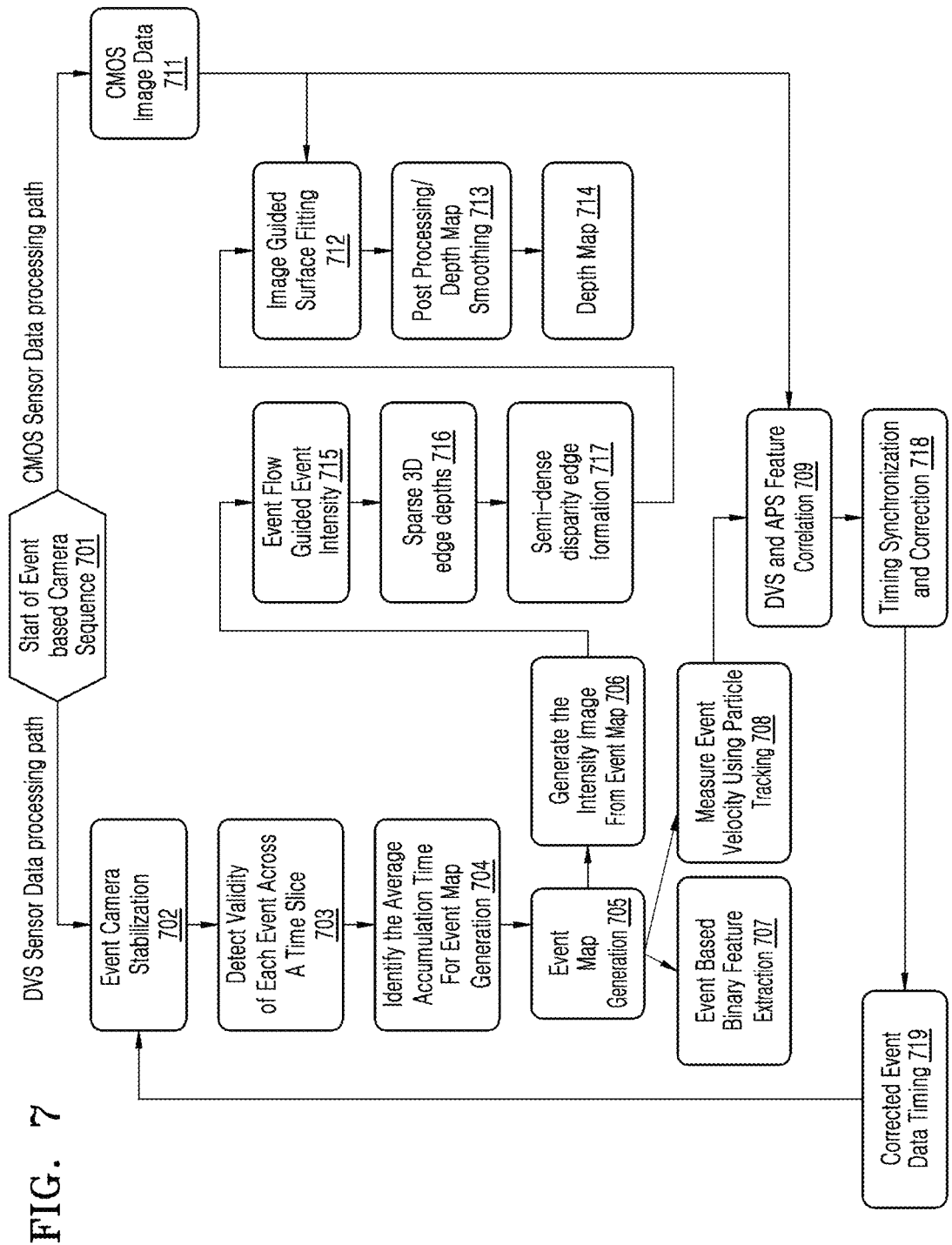
FIG. 7 is a flowchart illustrating a method for performing a depth estimation of an object in a scene, according to an embodiment.

FIG. 7 is a flow diagram illustrating an electronic device performing depth estimation of an object in an image of a scene, according to an embodiment.

Referring to FIG. 7, in step 701, the monocular event based sensor 110 starts capturing an event based camera sequence. Further, the monocular event based sensor 110 performs processing with respect to a DVS sensor data processing path and a CMOS sensor data processing path.

In step 702, the ESP 140 starts performing camera event stabilization, i.e., image stabilization, using a technology that reduces blurring associated with the motion of a camera or other image capturing device during exposure. Basically, an inertial measurement device may be used to measure a specific force and/or angular rate of a body in order to remove the effects of unwanted camera motion from input frames and to obtain a stabilized frame of the image. An inertial measurer may remove bias and/or temperature errors from the captured image to generate inertial measurement (IM) data. The IM data may be fused with event data, which may be obtained from an unstabilized image.

In step 703, the ESP 140 detects the validity of each event across a time slice.

In step 704, the ESP 140 identifies an average accumulation time for event map generation.

In step 705, the ESP 140 generates an event map based on the identified average accumulation time, and in step 706, the ESP 140 generates an intensity image from the event map.

In step 707, the ESP 140 performs event based binary feature extraction from the generated event map. In step 708, the ESP 140 measures an event velocity using particle tracking, and in step 709, outputs of the event based binary feature extraction and the event velocity are inputted to the DVS and APS feature correlation engine 131.

In step 711, the RGB image data from the CMOS image Sensor is processed. Steps 712-714 may be performed in parallel by the depth estimator 120 for creating the depth map.

In step 709, the DVS and APS feature correlation engine 131 may receive the input from the performing of the event based binary feature extraction, the event velocity, and the CMOS image data.

In step 718, the event sensor timing synchronization engine 133 performs timing synchronization and sends a result of timing synchronization to the corrected event timing engine 132.

In step 719, the corrected event timing engine 132 depth-processes the corrected event data timing event sensor data and performs event camera stabilization of the corrected event data timing event sensor data.

Figure 8A:
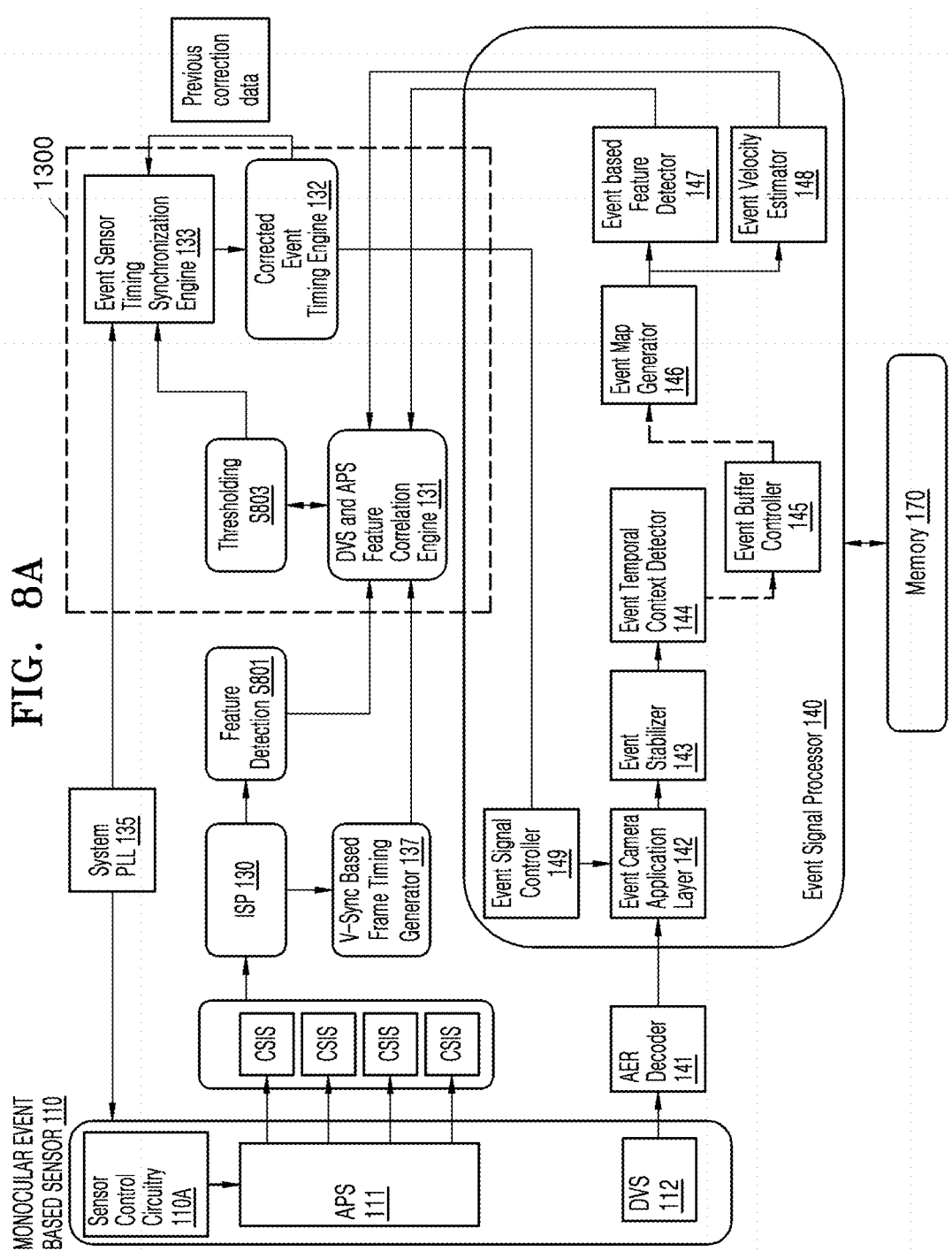
FIG. 8A is a process flow diagram illustrating an electronic device performing timing synchronization of event data, according to an embodiment.

FIG. 8A is a process flow diagram illustrating an electronic device performing timing synchronization of event data, according to an embodiment.

In general, a monocular event based sensor 110 is asynchronous in nature. The image data is represented in an AER format, which contains pixel coordinates, a timestamp for event generation, and an event type.

In the case of sensors that include dynamic and active pixels, there are two separate interfaces that transmit CMOS data via CSI D-PHY and event data via the AER bus interface. There are many techniques that are evolving to make use of both the event data and the CMOS data. However, since they are being generated and transmitted via two separate interfaces, there is a need for timing synchronization and correction of event data with respect to CMOS data for a sensor that includes dynamic and active pixels.

Referring to FIG. 8A, timing synchronization may be mainly performed by a correlation engine 1300, which includes a DVS and APS feature correlation engine 131, an event sensor timing synchronization engine 133, and a corrected event timing engine 132.

The timing synchronization engine 144 performs the timing synchronization and correction of the event data received from the monocular event based sensor 110 that includes the dynamic and active pixels.

For timing synchronization, the RGB data from the ISP 130 is processed to extract image features thereof. The ISP 130 also may generate a V-sync to indicate an end of RGB frames completion. The V-sync may be transmitted to the V-Sync based frame timing generator 137.

The event map from event map generator 146 may be processed to estimate event velocity using event velocity estimator 148 and detect event features using event based feature detector 147 in step S801. In addition, timing information via the system PLL 135 may be obtained. The outputs of the ISP 130 via the V-sync based frame timing generator 137 and the event based feature detector 147 may be combined and fused by the DVS and APS feature correlation engine 131 in order to generate DVS data.

Based on the aforementioned feature correlation, it is determined whether the feature correlation exceeds a predetermined threshold value in step S803. Based on the determination, the amount of timing correction to be applied may be determined on the DVS data.

Figure 8B:
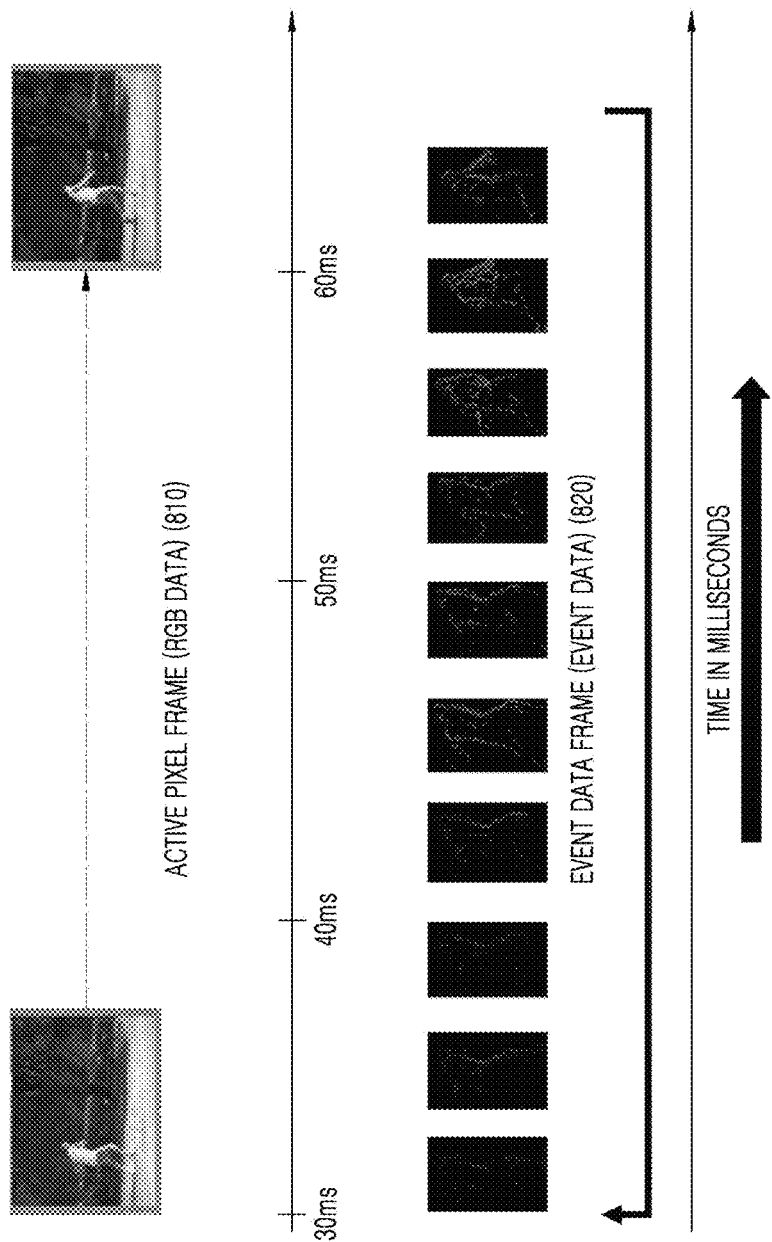
FIG. 8B illustrates timing synchronization of event data according to an embodiment.

FIG. 8B illustrates a timing synchronization of event data according to an embodiment.

Referring to FIG. 8B, the correlation engine 1300 may combine and/or fuse the RGB data 810 obtained from active pixel frames and event data 820 obtained from event data frames to correct and synchronize the time difference between the active pixel frames and event data frames.

Figure 9:
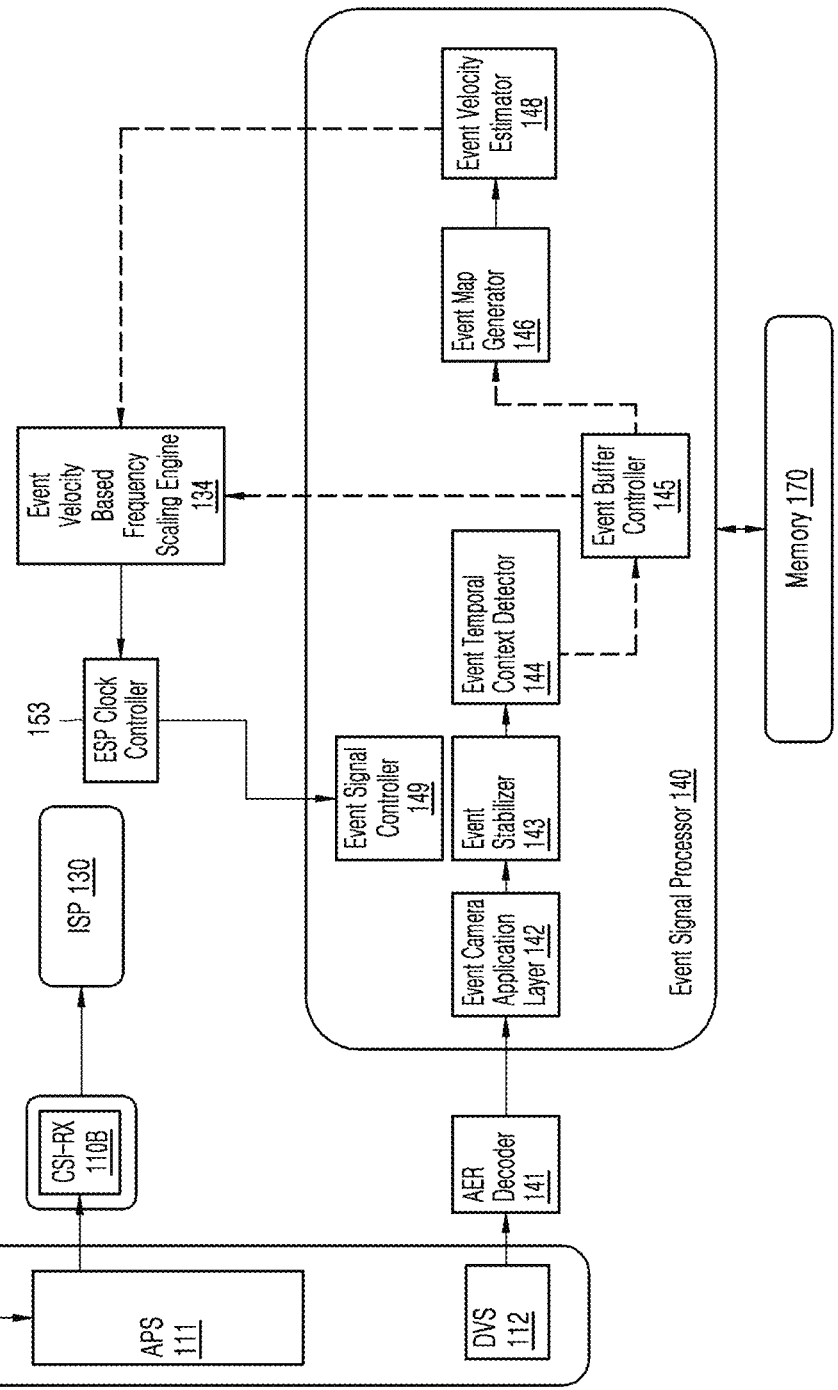
FIG. 9 is a process flow diagram illustrating an electronic device performing frequency scaling, according to an embodiment.

FIG. 9 is a process flow diagram illustrating an electronic device performing frequency scaling, according to an embodiment.

Referring to FIG. 9, during digital IP design for a camera based system, synthesis and timing closure for the maximum frequency by considering the input data rate and maximum throughput are used. Unlike traditional CMOS based sensors in which the input rate is deterministic, the monocular event based sensor 110 is asynchronous in nature. Hence, the rate of data arrival and required IP throughput vary.

However, in an actual operation, depth estimation IP should be clocked depending on criteria for maintaining an optimal balance between power and performance of an electronic device. The system of the disclosure includes the event velocity based frequency scaling engine 134 for the depth estimation IP that can consider input data rate and current throughput, and decide an IP operational frequency that can optimally balance power and performance.

The event velocity based frequency scaling engine 134 receives the output from the event velocity estimation engine 148 and event buffer controller 145 and processes the throughput to estimate the IP frequency.

Figure 10:
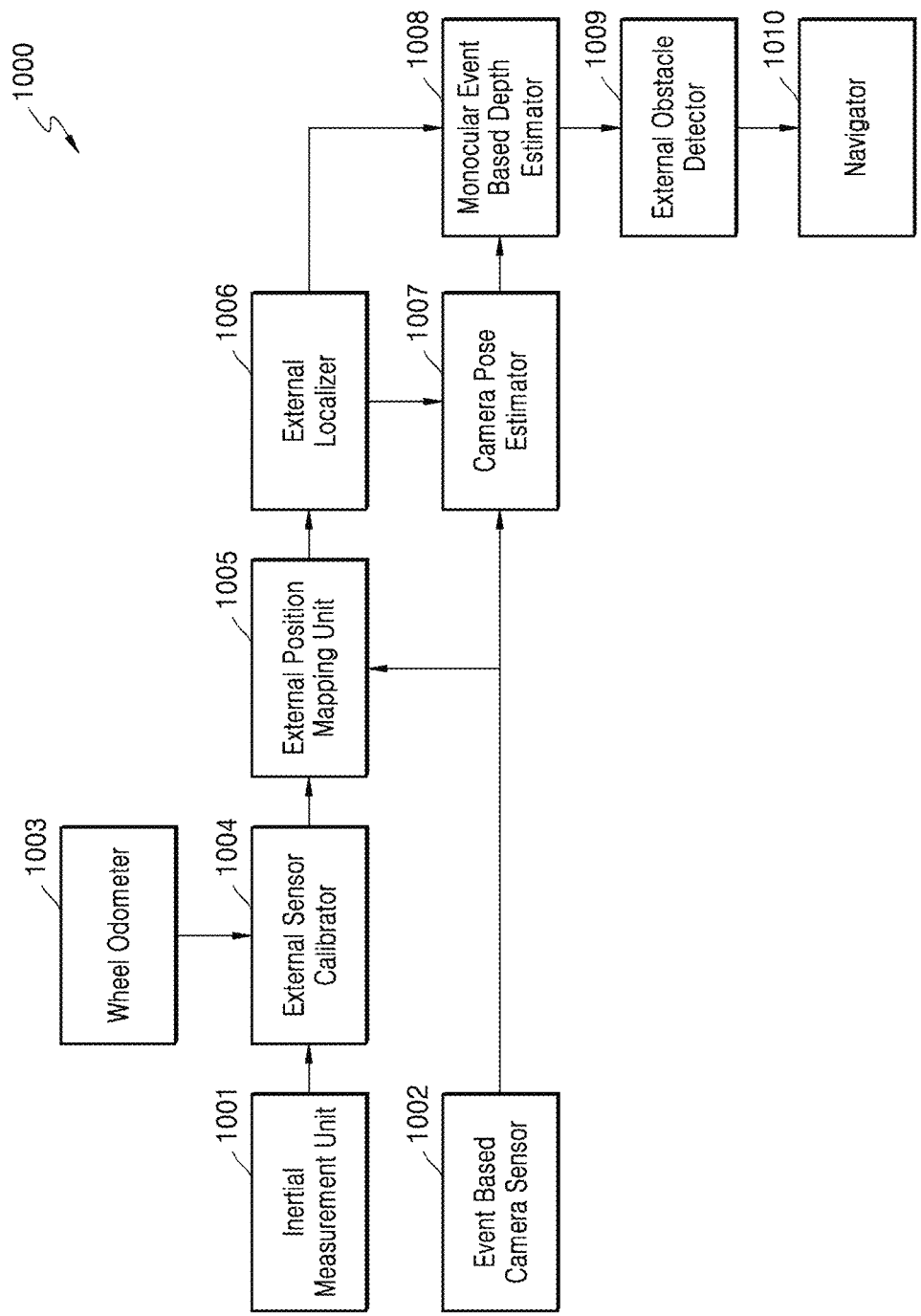
FIG. 10 is a process flow diagram illustrating an electronic device performing obstacle detection and navigation for an autonomous vehicle by using a depth map, according to an embodiment.

FIG. 10 is a process flow diagram illustrating obstacle detection and navigation via an autonomous vehicle by using a depth map, according to an embodiment.

Referring to FIG. 10, the operations performed by elements 1000-1010 may be used by the autonomous vehicle for obstacle detection or pedestrian tracking, especially in low light conditions.

More specifically, an onboard IMU 1001 operates in tandem with a wheel odometer 1003 to establish a global camera frame of reference and a trajectory thereof with respect to the time. A stream of pseudo images created by an event based camera sensor 1002 is used to extract event based features such as corners and line segments, which are then compared with IMU stabilized and localized data obtained by an external localizer 1006. Thereafter, an accurate camera pose is estimated by a camera pose estimator 1007.

An external sensor calibrator 1004, an external position mapping unit 1005, and the external localizer 1006 are configured to determine the exact location of an obstacle from real-time depth information with respect to the obstacle. Further, a navigator 1010 and an external obstacle detector 1009 determine the presence of the obstacle from real-time depth information.

A monocular event based depth estimator 1008 is configured to operate with low power consumption and provide accurate depth information even in the case of a low light environment. Pseudo frames created by the event based camera sensor 1002 give a sparse estimate of the depth map, which is further refined, and holes in the depth map are filled in and smoothened in real-time with time-correlated APS (RGB) frames.

In an advanced driver-assistance system (ADAS) including the elements of FIG. 10, an accurate depth map of an image of a scene is necessary for obstacle detection. Further, the ADAS system should work under various lighting conditions and provide fast visual feedback to a user for proper navigation. The monocular event based sensor 110 provides a higher frame rate, higher dynamic range (~120 dB) under extreme lighting conditions.

Figure 11:
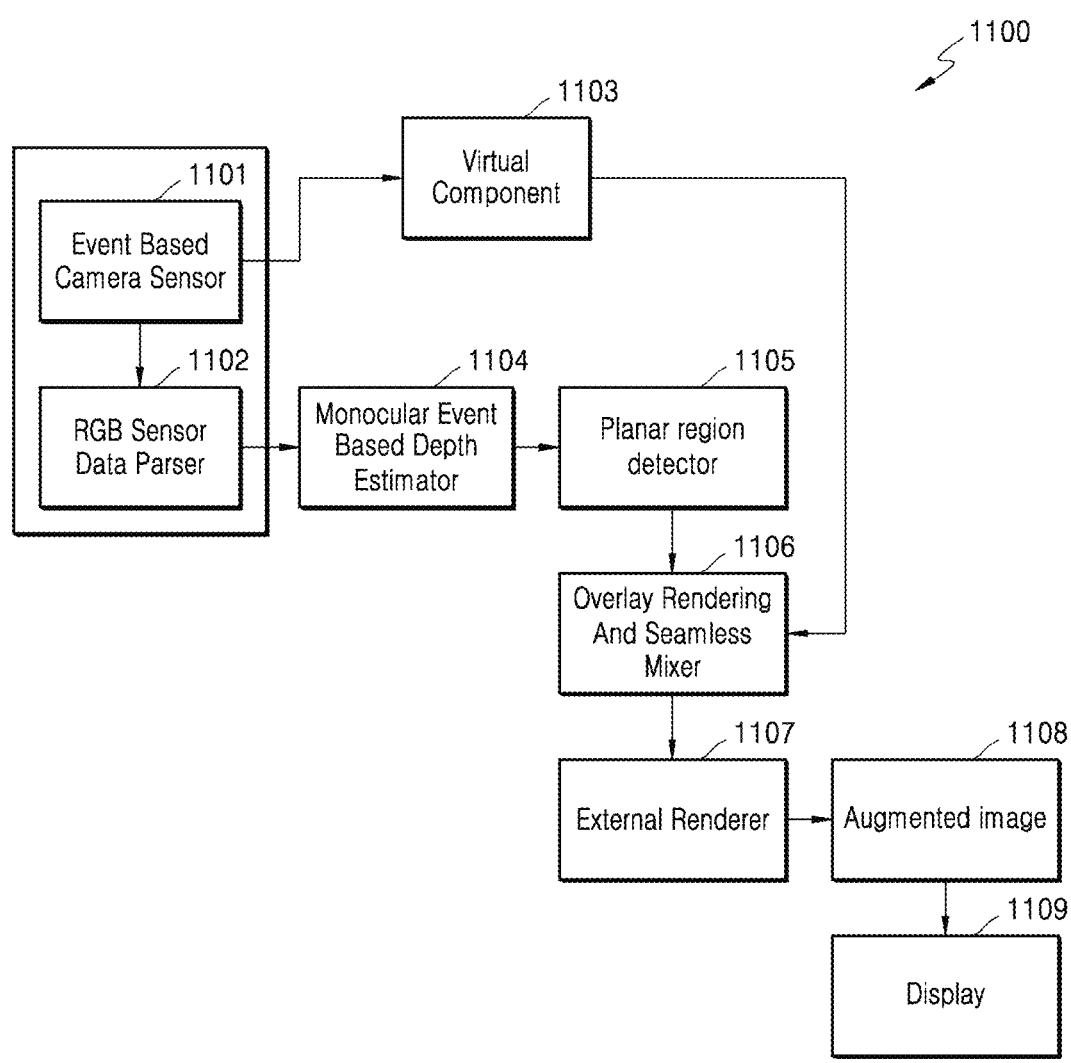
FIG. 11 is a process flow diagram illustrating an electronic device creating a depth map to be used in augmented reality (AR) shopping, according to an embodiment.

FIG. 11 is a process flow diagram using a depth map in AR shopping, according to an embodiment.

Referring to FIG. 11, the method may be used for determining an accurate depth map of an image of a scene including transparent and reflective surfaces and multiple objects. Operations performed by elements in the flow diagram 1100 may be used for AR shopping and allow a user to perform virtual object placement based on depth map estimation. The method of FIG. 11 may also be used in AR shopping use case to employ a real-time depth obtained from the method in virtual reality object placement/realization.

Refined accurate depth information from a monocular event based depth estimator 1104 is used by a planar region detector 1105 for plane estimation. A monocular event based depth estimator 1104 estimates a depth of an object in an image of a scene by fusing active pixels and event based data. Accordingly, 3D surfaces may be defined to project thereon virtual objects.

The planar region detector 1105 is used to detect plane regions in the scene to thereby identify a suitable placeholder for virtual object placement. An overlay rendering and seamless mixer 1106 is used to overlay the virtual objects in suitable regions identified by the planar region detector 1105.

Virtual components 1103 extracted from an event based camera sensor 1101 are warped with regard to the desired estimation calculated from the depth and plane information. This data is fused and the corresponding virtual component is overlaid on the rendering surface by an overlay and seamless mixer 1106. The resulting image is rendered alongside other image data as seen on a user's viewfinder/preview, providing an AR experience via an augmented image 1108 displayed on a display 1109.

Figure 12:
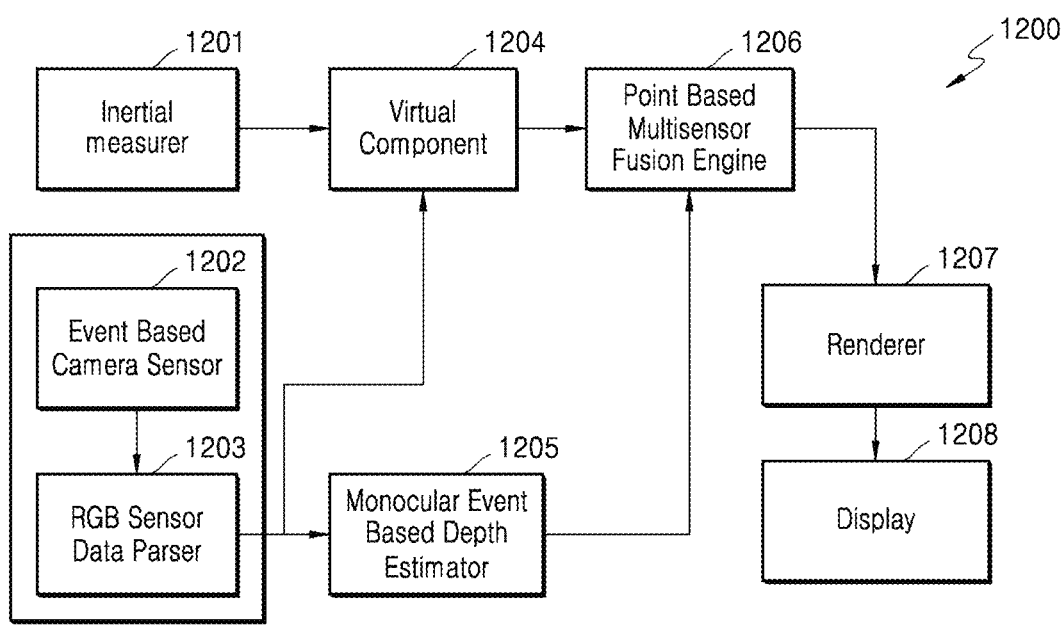
FIG. 12 is a process flow diagram for reconstructing a three-dimensional (3D) scene of a 3D image, according to an embodiment.

FIG. 12 is a process flow diagram for reconstructing a 3D scene of a 3D image, according to an embodiment.

Referring to FIG. 12, operations corresponding to elements 1201-1208 in the flow diagram 1200 may be used for reconstructing the 3D scene of the 3D image.

Depth maps are important for 3D imaging and displaying, and may be used in different application areas, such as digital holography image processing, object reconstruction in integral imaging, 3D object retrieval and scene understanding, and 3D printing. Further, the 3D depth maps are used in vision based application, such as in robotics, gaming, AR glass, etc.

An accurate depth map for an object in a scene obtained by using the monocular event based sensor 110 is used for virtual object placement. The accurate depth map may be used in product preview to visualize or understand different products and features.

Figure 13:
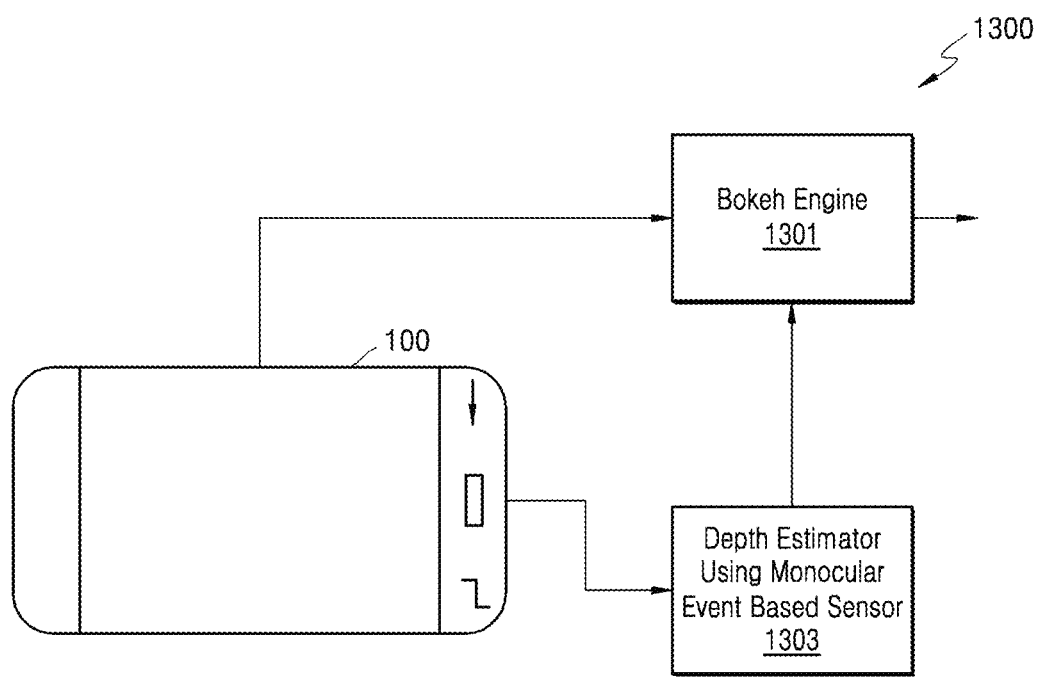
FIG. 13 is a process flow diagram for creating a bokeh effect using a depth map, according to an embodiment.

FIG. 13 is a process flow diagram for creating a bokeh effect using a depth map by using an electronic device, according to an embodiment.

Referring to FIG. 13, steps 1301 and 1303 may be used for creating a bokeh effect using a depth map. The electronic device 100 may capture an image of a scene and, based on processing via a bokeh engine 1301 and a depth estimator using a monocular event based sensor 1302, an accurate depth map of the image of the scene may be created.

The process may be used for creating a bokeh effect. Accordingly, a real-time depth map obtained according to the disclosure may be used to apply high quality bokeh effects on still images. A device (e.g., a smart camera platform) may capture a series of images rendered onto a preview/viewfinder for a user. Event data from an event pipeline is processed to get fine-grained accurate and real-time depth map via the depth estimator using a monocular event based sensor 1302. The depth map may be used to obtain solutions, such as the bokeh effect, in order to dissect a scene into multiple regions of depth and classify the multiple regions into layers of background or foreground based on a region of interest. Further, such a solution may be used to apply various image processing kernels to achieve desired results.

The embodiments disclosed herein may be implemented through at least one software program running on at least one hardware device and performing network management functions to control various elements.

The elements illustrated in FIGS. 1 through 13 include blocks, which may be at least one of a hardware device, a software module, or a combination of a hardware device and a software module.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method for performing depth estimation of an object in an image by an electronic device, the method comprising:
   capturing the image of a scene by the electronic device;
   obtaining, using a sensor of the electronic device, from the image, pixel intensity data and event data;
   generating an event depth map using the event data, wherein the event data includes event map data of the image and event velocity data of the image, and wherein the event data is obtained substantially along edges of the object; and
   generating a depth map for the object in the image using the event depth map and the pixel intensity data,
   wherein the sensor of the electronic device is an event based sensor and the event data comprises a format of a time sequence of an event e(n)={x″, y″, Θ″, t″} from the event based sensor, where n represents an integer number, x and y represents a coordinate of a pixel of the image, Θ represents a polarity of the event, and t represents the timestamp of the event which is triggered, and
   wherein a positive θ indicates that at a corresponding pixel, an increase of intensity by a certain threshold Δ+>0 in a log intensity space, and a negative θ indicates a drop of intensity by a second threshold Δ−>0 in the log intensity space.

2. The method of claim 1, wherein generating the event depth map comprises:
   generating a spatio-temporal two dimensional (2D) event map and an event intensity image by processing the event map data of the image; and
   generating the event depth map using the spatio-temporal 2D event map and the event velocity data.

3. The method of claim 2, wherein generating the event depth map using the spatio-temporal 2D event map and the event velocity data comprises using a rotation degree of a capturing device of the electronic device and translation estimation data of the sensor of the electronic device.

4. The method of claim 3, further comprising distributing the event depth map along edges of the image.

5. The method of claim 1, wherein generating the depth map for the object in the image using of the event depth map and the pixel intensity data comprises combining the event depth map with the pixel intensity data.

6. The method of claim 1, wherein generating the depth map for the object in the image comprises:
   obtaining a red, green, and blue (RGB) image from the image using the pixel intensity data;
   generating an intermediate depth map based on the event depth map and an event intensity image; and
   generating the depth map by combining the intermediate depth map with the RGB image.

7. The method of claim 6, wherein combining the intermediate depth map with the RGB image comprises combining the intermediate depth map with the RGB image by applying a guided surface fitting process.

8. The method of claim 6, wherein generating the depth map for the object in the image further comprises post-processing the intermediate depth map using depth smoothing and hole filling of the intermediate depth map.

9. The method of claim 1, further comprising performing timing synchronization and timing correction of the event data with respect to the pixel intensity data.

10. The method of claim 1, further comprising:
    performing a frequency scaling for a depth estimation circuitry of the electronic device based on a scene data rate of the data and a maximum throughput of the electronic device; and
    determining an operational frequency of the electronic device based on the frequency scaling.

11. The method of claim 1, further comprising:
    obtaining, by the sensor, depth information of the object in the image; and
    obtaining, by the sensor, motion information of the object in the image.

12. The method of claim 1, further comprising generating the pixel intensity data by interpolating accumulated event data.

13. An apparatus for performing depth estimation of an object in an image, the apparatus comprising:
    a camera configured to capture the image of a scene;
    a sensor configured to obtain pixel intensity data and event data from the image; and
    a processor configured to:
       generate an event depth map using the event data, which includes an event map data of the image and an event velocity data of the image, wherein the event data is obtained substantially along edges of the object, and
       generate a depth map for the object using the event depth map and the pixel intensity data,
    wherein the sensor is an event based sensor and the event data comprises a format of a time sequence of an event e(n)={x″, y″, Θ″, t″} from the event based sensor, where n represents an integer number, x and y represents a coordinate of a pixel of the image, Θ represents a polarity of the event, and t represents the timestamp of the event which is triggered, and
    wherein a positive θ indicates that at a corresponding pixel, an increase of intensity by a certain threshold Δ+>0 in a log intensity space, and a negative θ indicates a drop of intensity by a second threshold Δ−>0 in the log intensity space.

14. The apparatus of claim 13, wherein the processor is further configured to generate the event depth map by:
    generating a spatio-temporal two dimensional (2D) event map and an event intensity image using the event map data of the image; and generating the event depth map using the spatio-temporal 2D event map and the event velocity data of the image.

15. The apparatus of claim 14, wherein the processor is further configured to use the spatio-temporal 2D event map and the event velocity data by using a rotation degree of the camera and translation estimation data of the sensor.

16. The apparatus of claim 13, wherein the processor is further configured to use the event depth map and the pixel intensity data by combining the event depth map with the pixel intensity data.

17. The apparatus of claim 13, wherein the processor is further configured to generate the depth map for the object in the image by:
   obtaining a red, green, and blue an (RGB) image from the image using the pixel intensity data;
   generating an intermediate depth map based on the event depth map and an event intensity image; and
   generating the depth map by combining the intermediate depth map with the RGB image.

18. A non-transitory computer readable medium storing instructions thereon that, when executed, instruct at least one processor to perform a method for performing depth estimation of an object in an image, the method comprising:
   capturing the image of a scene by an electronic device;
   obtaining, using a sensor of the electronic device, from the image, pixel intensity data and event data;
   generating an event depth map using the event data, wherein the event data includes event map data of the image and event velocity data of the image, and wherein the event data is obtained substantially along edges of the object; and
   generating a depth map for the object in the image using the event depth map and the pixel intensity data,
   wherein the sensor of the electronic device is an event based sensor and the event data comprises a format of a time sequence of an event $e(n)=\{x'', y'', \Theta'', t''\}$ from the event based sensor, where n represents an integer number, x and y represents a coordinate of a pixel of the image, $\Theta$ represents a polarity of the event, and t represents the timestamp of the event which is triggered, and
   wherein a positive $\theta$ indicates that at a corresponding pixel, an increase of intensity by a certain threshold $\Delta+>0$ in a log intensity space, and a negative $\theta$ indicates a drop of intensity by a second threshold $\Delta->0$ in the log intensity space.

* * * * *